US012766930B2

(12) United States Patent
Martinez-Armendariz

(10) Patent No.: US 12,766,930 B2
(45) Date of Patent: Oct. 20, 2026

(54) AUTOMATED SUNSHADE SYSTEMS AND METHODS

(71) Applicant: Sergio Martinez-Armendariz, Las Vegas, NV (US)

(72) Inventor: Sergio Martinez-Armendariz, Las Vegas, NV (US)

( * ) Notice: Subject to any disclaimer, the term of this patent is extended or adjusted under 35 U.S.C. 154(b) by 280 days.

(21) Appl. No.: 18/667,093

(22) Filed: May 17, 2024

(65) Prior Publication Data

US 2025/0353360 A1 Nov. 20, 2025

(51) Int. Cl.
*B60J 1/20* (2006.01)

(52) U.S. Cl.
CPC ........... *B60J 1/2016* (2013.01); *B60J 1/2025* (2013.01); *B60J 1/2052* (2013.01)

(58) Field of Classification Search
CPC . B60J 1/20; B60J 1/2011; B60J 1/2013; B60J 1/2016; B60J 1/2019; B60J 1/2025; B60J 1/2044; B60J 7/0007; B60J 7/0015
See application file for complete search history.

(56) References Cited

U.S. PATENT DOCUMENTS 4,902,062 A * 2/1990 Pusic ..................... B60J 3/0204 296/97.4
5,042,866 A * 8/1991 Cody ..................... B60J 1/2019 296/141
5,054,847 A * 10/1991 Asoh ........................ B60J 7/061 296/124
5,201,563 A * 4/1993 Liao ....................... B60J 1/2011 296/97.4
5,823,607 A * 10/1998 Hindson .................. B60J 11/02 160/370.21
6,086,133 A * 7/2000 Alonso .................. B60J 1/2058 296/141
6,983,786 B2 * 1/2006 Chen ...................... B60J 1/2052 160/370.22
7,322,606 B2 * 1/2008 Yamamura ............. B60R 21/08 280/730.2
7,389,806 B2 * 6/2008 Kates ........................ E06B 9/68 160/310
7,599,612 B2 * 10/2009 Moseley ................... E06B 9/68 160/310
7,658,670 B1 * 2/2010 Brown .................. B60H 1/267 454/189

(Continued)

FOREIGN PATENT DOCUMENTS

CN 1593970 A * 3/2005 ............ B60J 1/2027
CN 109334414 A * 2/2019 .............. B60J 5/042

(Continued)

*Primary Examiner* — Johnnie A. Shablack
(74) *Attorney, Agent, or Firm* — Procopio, Cory, Hargreaves & Savitch LLP

(57) ABSTRACT

An automated sunshade system and method comprise a sunshade, a guide assembly comprising a set of guiding gear motors or guide rails that are integrated with pillars of a vehicle, a belt, motors comprising gears that are configured to move the belt, a shaft coupled to the sunshade, a winding assembly that rotates the shaft that winds the sunshade from an extended position to a retracted position, a circuit comprising a controller that controls the motors, and a user interface comprising at least one of a touchscreen, a keyfob, or a push button to activate and control the position of the sunshade.

6 Claims, 4 Drawing Sheets

(56) References Cited

U.S. PATENT DOCUMENTS

| | | | | | |
|---|---|---|---|---|---|
| 7,690,414 | B2 * | 4/2010 | Knowles | B60J 1/2025 160/90 |
| 7,723,939 | B2 * | 5/2010 | Carmen, Jr. | E06B 9/40 318/16 |
| 8,070,211 | B2 * | 12/2011 | Suh | B60J 11/00 296/136.12 |
| 8,366,172 | B1 * | 2/2013 | Morazan | B60J 7/0007 296/97.1 |
| 8,726,968 | B2 * | 5/2014 | Sievers | B60J 1/2011 160/90 |
| 9,045,021 | B2 * | 6/2015 | Sene | B60J 3/002 |
| 9,079,479 | B2 * | 7/2015 | Chen | B60J 1/2077 |
| 9,278,610 | B2 * | 3/2016 | Nania | B60J 7/06 |
| 9,908,395 | B2 * | 3/2018 | Lichowski | B60J 11/02 |
| 10,059,175 | B2 * | 8/2018 | Cuddihy | B60J 1/2016 |
| 10,857,862 | B2 * | 12/2020 | Grimaldo | B60J 7/0573 |
| 11,065,947 | B2 * | 7/2021 | Lee | B60J 7/0007 |
| 11,192,430 | B2 * | 12/2021 | Urano | B60J 1/2016 |
| 12,134,306 | B2 * | 11/2024 | Wilder | B60J 1/002 |
| 12,539,809 | B2 * | 2/2026 | Olivera Navarro | B60Q 3/208 |
| 2005/0051285 | A1 * | 3/2005 | Yano | B60J 1/2027 160/370.22 |
| 2013/0233496 | A1 * | 9/2013 | Ogden, Jr. | E06B 9/322 160/331 |
| 2015/0107783 | A1 * | 4/2015 | Chen | B60J 1/2019 160/310 |
| 2016/0303950 | A1 * | 10/2016 | Lekar | B60J 1/2061 |
| 2020/0016960 | A1 * | 1/2020 | Greene | B60J 1/2041 |
| 2020/0254861 | A1 * | 8/2020 | Villarreal | B60J 11/08 |
| 2021/0252952 | A1 * | 8/2021 | Iriate | B60J 1/2052 |
| 2024/0351407 | A1 * | 10/2024 | Hardy | B60J 1/2019 |
| 2025/0353360 | A1 * | 11/2025 | Martinez-Armendariz | B60J 1/2016 |

FOREIGN PATENT DOCUMENTS

| | | | | | |
|---|---|---|---|---|---|
| CN | 118024840 | A | * | 5/2024 | B60J 1/208 |
| CN | 120327211 | A | * | 7/2025 | B60R 21/055 |
| DE | 4105865 | A1 | * | 8/1992 | E06B 9/92 |
| DE | 20022872 | U1 | * | 5/2002 | B60J 1/2011 |
| DE | 102008022721 | A1 | * | 11/2009 | B60J 1/2077 |
| DE | 102008025741 | A1 | * | 12/2009 | B60J 1/2063 |
| EP | 0989006 | A1 | * | 3/2000 | B60J 1/2019 |
| EP | 1872989 | A2 | * | 1/2008 | B60J 1/2075 |
| EP | 2098394 | A1 | * | 9/2009 | B60J 7/0015 |
| FR | 2937913 | A1 | * | 5/2010 | B60J 7/0015 |
| FR | 3133567 | A1 | * | 9/2023 | B60J 1/2077 |
| JP | 2000272341 | A | * | 10/2000 | B60J 7/0015 |
| KR | 920005316 | Y1 | * | 8/1992 | B60J 7/0015 |
| KR | 20060063298 | A | * | 6/2006 | A47H 5/0325 |
| KR | 20090009404 | U | * | 9/2009 | B60J 1/2016 |
| KR | 20130096418 | A | * | 8/2013 | B60J 7/0015 |
| KR | 20130123943 | A | * | 11/2013 | B60J 3/002 |
| KR | 20220022061 | A | * | 2/2022 | F16H 7/02 |
| WO | WO-0149516 | A1 | * | 7/2001 | B60J 1/2011 |
| WO | WO-2024212640 | A1 | * | 10/2024 | B60J 7/003 |

* cited by examiner

AUTOMATED SUNSHADE SYSTEMS AND METHODS

BACKGROUND

Field

The present invention relates generally to automobile sunshade systems and methods and, more specifically, to automated systems and methods for vehicle sunshades designed to provide effective sunlight blocking for windshields and other windows.

Related Art

Sunlight that impinges on automobiles can have several adverse effects, such as a bleaching effect on the automobile's interior as well as a greenhouse effect that is known to increase the vehicle's interior to temperatures that are perceived as uncomfortable by drivers, passengers, and animals. Especially in the summer months, sunlight can cause the interior of a vehicle that is parked under the sun without much shade to easily heat up to triple-digit temperatures. As a result, the surfaces of the vehicle's dashboards and upholstery can become sufficiently hot to potentially cause injury upon contact.

Conventional sunshades are predominantly found in sunroofs and rear windows of vehicles. Their application in windshields is still less common, with the exception of manually foldable covers. These, including conventional sunshades for side windows, do not cover the entire window surface and, thus, only partially block the sun from entering the car. Moreover, they are cumbersome to use. Some approaches use suction cups that oftentimes fail to remain in place, further exacerbating the user-unfriendliness of existing designs.

Therefore, there is a need for automated and easy-to-use windshield sunshades and operating methods that can shield the interior of a vehicle from elevated temperatures caused by radiation and conduction heat transfer, such as to maintain a pleasant atmosphere inside the vehicle even when the vehicle is directly exposed to harsh sunlight. This will protect the interior of vehicles against harmful UV radiation and prevent occupants entering the vehicle from injuries that can be caused by contact with excessively hot surfaces.

SUMMARY

Automated systems and methods for vehicle sunshades that are mounted within a vehicle's structure, effectively block sunlight from entering the car through the windshield and other windows. Various embodiments comprise a sunshade made of sun-blocking material, a track system that is housed within the pillars of the vehicle, a motor-driven belt, electric motors, and other circuitry, such as a touchscreen, a push button, a keyfob, and an RF receiver. The sunshade system operates by extending and retracting sunshade material across the window, providing effective shielding against sunlight.

In some aspects, the techniques described herein relate to an automated sunshade system including: a sunshade including a first end and a second end, the sunshade configured to block sunlight from a vehicle; a guide assembly including at least one of a set of guiding gear motors or a set of guide rails, the guide assembly configured to be integrated with pillars of the vehicle to guide a movement of the sunshade between a retracted position and an extended position, wherein the pillars include a first opening that accommodates at least a first portion of the sunshade; a belt configured to facilitate the movement; a first set of motors and a second set of motors that each includes a set of gears that is configured to move the belt; a shaft that is coupled to the second end of the sunshade; a winding assembly coupled to the second set of motors, the winding assembly configured to rotate the shaft to wind the sunshade from the extended position to the retracted position; a circuit including a controller, the controller coupled to control at least one of the first set of motors and a second set of motors; and a user interface including at least one of a touchscreen, a keyfob, or a push button, each configured to activate and control a position of the sunshade.

In some aspects, the techniques described herein relate to a system, wherein the user interface further includes an RF receiver that is configured to receive RF signals from the keyfob to control the position of the sunshade.

In some aspects, the techniques described herein relate to a system, wherein the keyfob is configured to remotely operate the sunshade.

In some aspects, the techniques described herein relate to a system, wherein the controller is configured to communicate control signals to at least some of the first set of motors, the second set of motors, and the guiding gear motors.

In some aspects, the techniques described herein relate to a system, wherein the control signals synchronize one or more of the first set of motors, the second set of motors, and the guiding gear motors.

In some aspects, the techniques described herein relate to a system, wherein the first end of the sunshade is coupled to at least one of a connector, a chain or a pulley system, or a cable to facilitate the movement.

In some aspects, the techniques described herein relate to a system, wherein at least one of the first set of motors and a second set of motors includes a stepper motor.

In some aspects, the techniques described herein relate to an automated sunshade system, wherein the user interface includes at least one control unit disposed within an interior portion of the vehicle.

In some aspects, the techniques described herein relate to an automated sunshade system, wherein the shade moves to a predetermined position on the windshield in response to user input.

In some aspects, the techniques described herein relate to an automated sunshade system, wherein the RF receiver is configured to communicate with a mobile device that enables a remote operation of the shade by a user from an area outside of the vehicle.

In some aspects, the techniques described herein relate to an automated sunshade system, wherein the circuit is communicatively coupled to a sensor to detect at least one of a temperature or a UV radiation level.

In some aspects, the techniques described herein relate to an automated sunshade system, wherein the shaft and the second set of motors are located below the surface of a dashboard.

In some aspects, the techniques described herein relate to an automated sunshade system, wherein the dashboard includes a second opening that accommodates at least a second portion of the sunshade.

In some aspects, the techniques described herein relate to a method of operating a sunshade system, the method including receiving from a user interface that includes at least one of a touchscreen, a keyfob, or a push button a command; and in response to receiving the command, performing steps to control a position of a sunshade, wherein the steps include communicating a command to at least one of a first set of motors or a second set of motors to control a movement of a belt.

In some aspects, the techniques described herein relate to a method, further including, wherein the steps further include an initiation step that activates at least one of a first or second set of motors.

In some aspects, the techniques described herein relate to a method, further including, wherein the command includes an instruction to rotate at least one of the first or second set of motors by a predetermined angle.

In some aspects, the techniques described herein relate to a method, further including, wherein the steps further include, in response to a stop condition being satisfied, communicating an instruction to stop to at least one of the first or second set of motors.

In some aspects, the techniques described herein relate to a method, further including, in response to detecting at least one of a temperature or a UV radiation level, automatically controlling a sunshade system to move the shade in a predetermined position.

In some aspects, the techniques described herein relate to a method, further including receiving RF signals from the keyfob via an RF receiver included in the user interface to control the position of the sunshade.

In some aspects, the techniques described herein relate to a method, further including remotely operating the sunshade using the keyfob.

DETAILED DESCRIPTION

Figure 1:
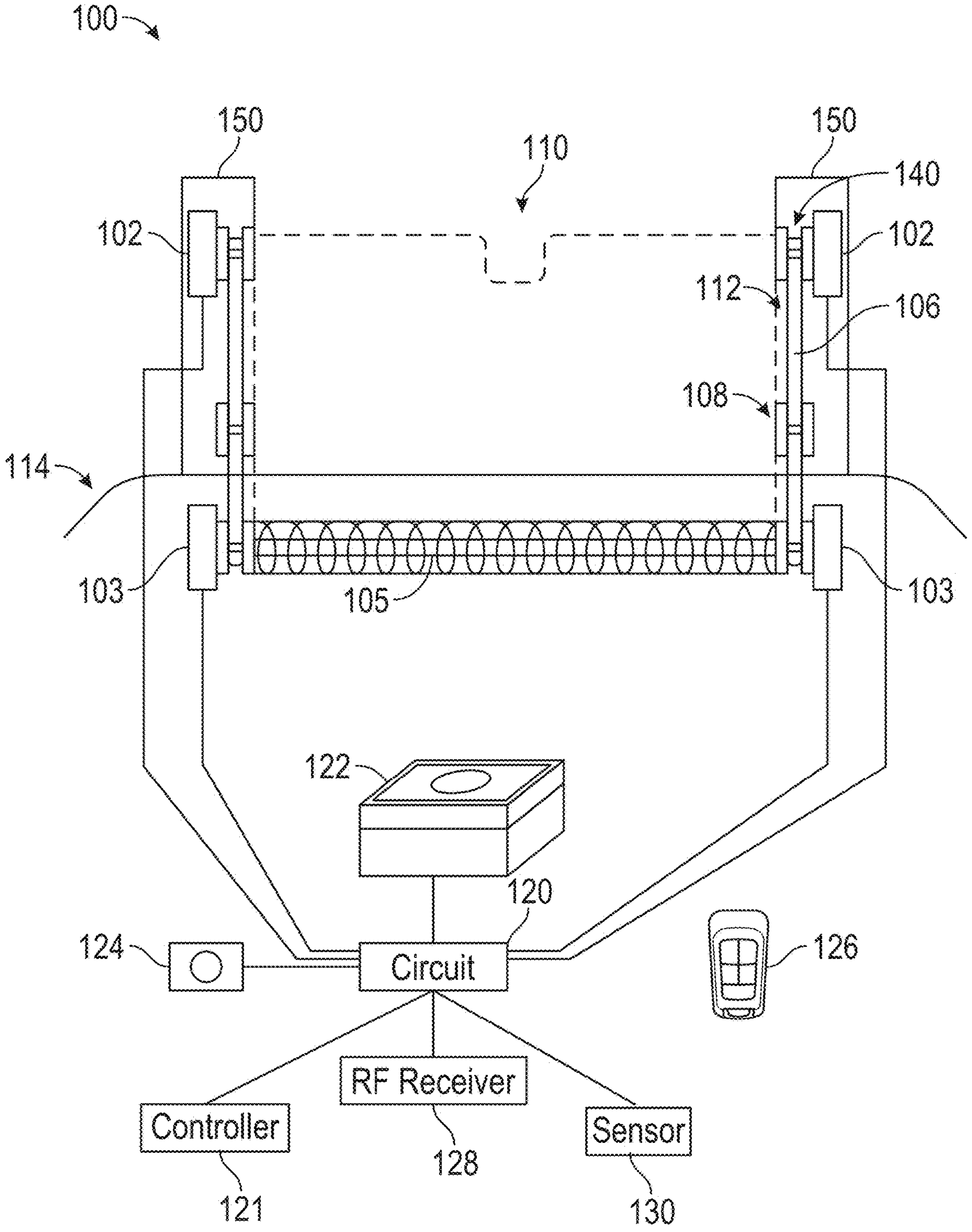
FIG. 1 illustrates an automated sunshade system according to various embodiments of the present disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an automated sunshade system according to various embodiments of the present disclosure. System 100 comprises sunshade 110, pillars 150 that comprise opening 112 (e.g., a slit), guide assembly 140 that is housed within pillars 150 and comprises belt 106, first set of motors 102, second set of motors 103, guiding gear 108, and shaft 105. System 100 further comprises circuit 120, touchscreen 122, push button 124, keyfob 126, RF receiver 128, and sensor 130.

The first set of motors 102 is positioned at the top of pillar 150, while the second set of motors 103 is located inside the vehicle's dashboard 114, along with shaft 105 and sunshade 110 in its retracted state. It is noted that while circuit 120 is depicted as a standalone device in FIG. 1, keyfob 126 or push button 124 may be integrated with circuit 120.

Sunshade 110 may be fabricated from material that is configured to block sunlight from entering a vehicle's window(s). A suitable material may be made of fabric mesh that is at least partially transparent to provide a see-through effect. Sunshade 110 comprises a first end and a second end. The first end of sunshade 110 is attached to shaft 105, which may extend across the vehicle's window and be connected to second set of motors 103, e.g., through a welded connection.

When the system is not in operation, sunshade 110 wraps around shaft 105 which is located within dashboard 114. The second end of sunshade 110 is attached to guide assembly or winding assembly 140, which comprises shaft 105 that is used to wind sunshade 110 from an extended position that provides shade to a retracted position when not in use.

Movement of sunshade 110 between the retracted and extended positions is facilitated by belt 106, to which sunshade 110 is attached. In embodiments, the connection between belt 106 and sunshade 110 may be implemented by a releasable connection, such as Velcro. Advantageously, such a releasable connection can be disengaged in situations when sunshade 110 is inadvertently operated, e.g., when the vehicle is in motion or an emergency situation.

Belt 106 is configured to move smoothly, avoiding any undesirable snagging or jamming of sunshade 110. Both belt 106 and the connection are designed to have sufficient strength to support the weight and tension of sunshade 110.

In operation, belt 106 is moved by shaft 105, which is coupled to two sets of motors: a first set of motors 102 and a second set of motors 103. First set of motors 102 is coupled to a set of guide assembly 140 that is configured to move belt 106. Second set of motors 103 is configured to initiate a rotation of shaft 105 by generating a suitable rotational force. This force is transferred to belt 106, which pulls sunshade 110 upwards from dashboard 114 along the guide system 140 within pillars 150. Simultaneously, the second set of motors 103 unwinds the sunshade material from shaft 105. The process is reversed when the sunshade system is deactivated, lowering sunshade 110 back to the dashboard.

At least one of these sets of motors may comprise an electric servo motor or stepper motor that allows for clockwise and counterclockwise rotation of shaft 105 and enables precise control over the movement of sunshade 110. An exemplary servo motor may be a parallax continuous rotation servo motor that can rotate 360 degrees around an axis. System 100 further comprises guide assembly 140, which comprises guiding gear 108. Guide assembly 140 is integrated with the vehicle's pillars 150, which may have an opening or slit 112 that accommodates at least a portion of sunshade 110 and enables the sunshade to traverse the length of the windshield. Guide assembly 140 helps to hold belt 106 in position and guide its movement, thereby providing a controlled motion for sunshade 110 between retracted and extended positions.

Guiding gear 108 may be implemented by any structure that aids in maintaining a position of belt 106 relative to motors 102, 103 during the operation of sunshade 110. For example, guiding gear 108 may be implemented as guide rails, guiding gear motors that are gutted and have attached gears that can freely move, or any other gear assembly that prevents belt 106 from drooping during operation.

The operation of motors 102, 203 and the movement of sunshade 110 are controlled by circuit 120, which may include controller 121. Controller 121 may connect to various electronic components of system 100 to manage electrical signals between two or more components in FIG. 1. The motors may be configured to modulate the speed and/or direction of belt 106, e.g., based on user input. Circuit 120 utilizes controller 121 to manage a power supply (not shown) that supplies power to motors 102, 103 and translates user input into motor commands. For example, if a user intends to move sunshade 110 halfway across a windshield, circuit 120 may calculate appropriate motor rotations and belt movements to achieve the desired position.

Controller 121, which may be implemented as any suitable programmable controller (e.g., an Arduino mega microcontroller board), is communicatively coupled to at least one of the sets of motors and is capable of sending control signals that synchronize the operation of the motors.

System 100 includes a user interface that may comprise touchscreen 122, keyfob 126, and/or push button 124. These devices are used to activate and control the position of sunshade 110 relative to a window (not shown). Touchscreen 122 and push button 124, which provide alternative methods for controlling sunshade system 100, may be located on the vehicle's dashboard 114 or be integrated into the vehicle's central console, while keyfob 126 and RF receiver 128 enable remote operation of sunshade system 100. RF receiver 128, upon receiving a signal, sends a signal to motors 102, 103 via circuit 120.

Keyfob 126 and touchscreen 122 may communicate with RF receiver 128, which is part of the user interface. Receiver 128 is configured to receive RF signals from keyfob 126, which allows a user to remotely control the position of sunshade 110. For example, pressing a button on keyfob 126 may cause an RF signal comprising a command to be created and wirelessly communicated to receiver 128. The command may prompt receiver 128 to transmit a wired signal to controller 121 to move sunshade 110 up or down. Similarly, touchscreen 122 may be used to communicate a signal to controller 121 that moves sunshade 110 up or down. In addition, RF receiver 128 may be configured to wirelessly communicate with a mobile device, e.g., to enable a user to operate sunshade 110 from a distance outside of the vehicle that is greater than the transmission radius of keyfob 126.

As depicted in FIG. 1, circuit 120 is connected to sensor 130. Sensor 130 is configured to detect an environmental condition, such as temperature, UV radiation levels, etc. This allows system 100 to automatically adjust the position of sunshade 110 based on environmental conditions, thereby providing effective shading and comfort for the vehicle's occupants.

Although not expressly shown, it is understood that any of the electric components in FIG. 1 may be powered by one or more power sources, such as the vehicle's own battery or any number of external batteries known in the art. Further, system 100 may comprise any number of indicators, such as visual indicators (e.g., light-emitting diodes) that communicate a status of system 100. For example, a green light may indicate that the status of sunshade 110 is in a closing mode (i.e., moving upward), whereas a red light may indicate that sunshade 110 is in an opening mode (i.e., moving downward).

Figure 2:
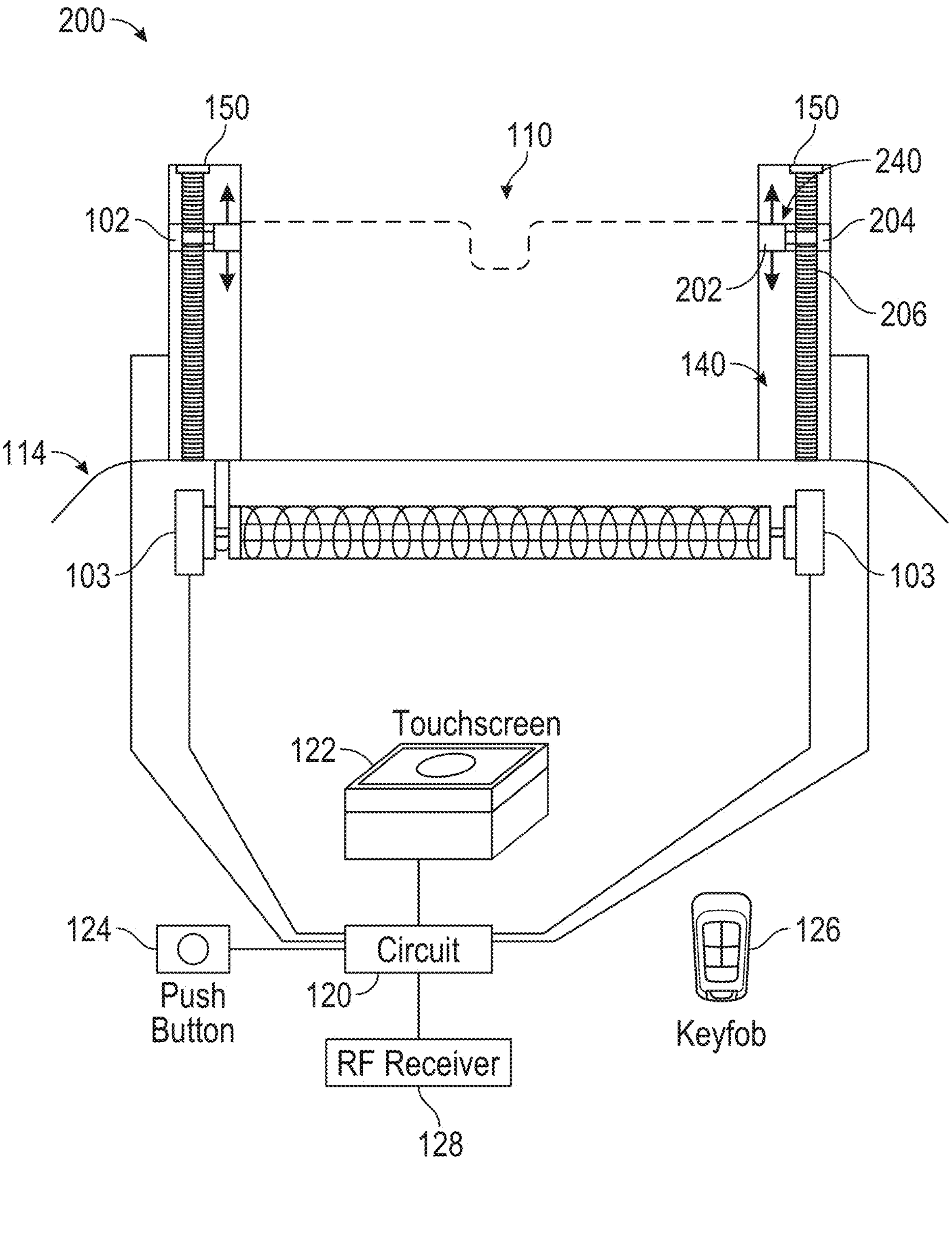
FIG. 2 illustrates another automated sunshade system according to various embodiments of the present disclosure.

FIG. 2 illustrates another automated sunshade system according to various embodiments of the present disclosure. For clarity, components similar to those shown in FIG. 1 are labeled in the same manner. Unlike the drive mechanism in FIG. 1, guide assembly 240 has no belt. Instead, power screw motor 202 is used to move sunshade 110 in up and down directions along screw thread shaft 206 to which power screw motor 202 is attached via power-nut 204. In embodiment, sunshade 110 may be releasably attached to power screw motors 202, e.g., via a Velcro connection.

It is noted that although not depicted in FIG. 2, as discussed with reference to FIG. 1, pillar 150 may have an opening or slit to allow material to pass through. It is further noted that motors 103 located under dashboard 114 need not be physically connected to screw thread shaft 206. As a person of skill in the art will appreciate the presented mechanisms for moving sunshade 110 in FIG. 1 and FIG. 2 are not limited to the constructional details shown therein or described in the accompanying texts. Other suitable mechanisms may comprise, for example, freestanding structures that do not utilize pillar 150.

For purposes of brevity, a description of motors 103, circuit 120, touchscreen 122, push button 124, keyfob 126, RF receiver 128, and sensor 130 and their function is not repeated here.

Figure 3:
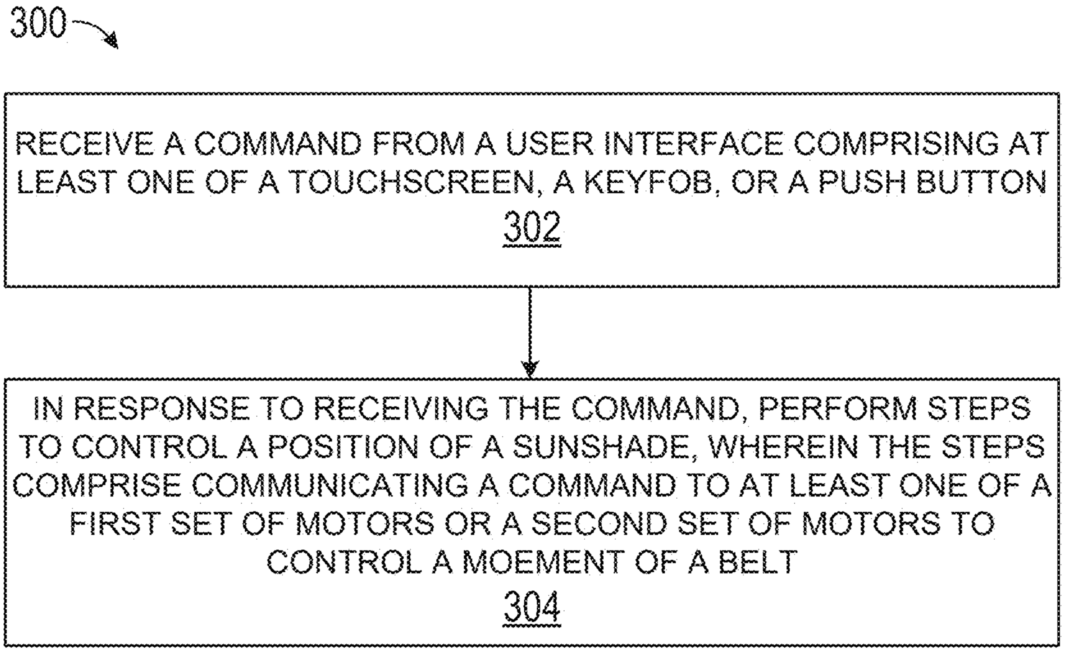
FIG. 3 is a flowchart illustrating an exemplary process for operating a sunshade system according to various embodiments of the present disclosure.

FIG. 3 is a flowchart illustrating an exemplary process for operating a sunshade system according to various embodiments of the present disclosure. In embodiments, process 300 may start at step 302, when a command is received from a user interface. The user interface may comprise at least one of a touchscreen, a keyfob, or a push button and be located on the vehicle's dashboard or integrated into the vehicle's central console. The touchscreen, keyfob, or push button can communicate with the RF receiver enabling the user to conveniently manipulate the position of the sunshade.

Once the command has been received, steps comprising step 304 may be performed to control the position of a sunshade. Such steps include communicating a command to at least one of a first set of motors or a second set of motors to control the movement of a belt, via a set of gears. A belt attached to the sunshade facilitates a transition of the sunshade between its retracted and extended position. This communication process is managed by a controller, which may be user-programmable, such as an Arduino mega microcontroller board. The controller sends control signals that synchronize the operation of the motors, thus ensuring proper operation of the sunshade. The first set of motors may be located at the top of the pillar, coupled to a set of gears configured to move the belt. The second set of motors, located inside the vehicle's dashboard, initiates the rotation of the shaft by generating the necessary rotational force. The force produced is transferred to the belt, pulling the sunshade upwards from the dashboard along the guide system within the pillars. This process is reversed when the system is deactivated, returning the sunshade back to its retracted position on the dashboard. The motors are designed to modulate the movement, speed, and direction of the belt based on the user's command. These motors may include an electric servo motor or stepper motor that allows for precise control over the sunshade's movement.

In addition, any number of sensors may detect environmental conditions and allow the system to automatically adjust the position of the sunshade based on the detected conditions, thereby providing effective shading and comfort for the vehicle's occupants.

Figure 4:
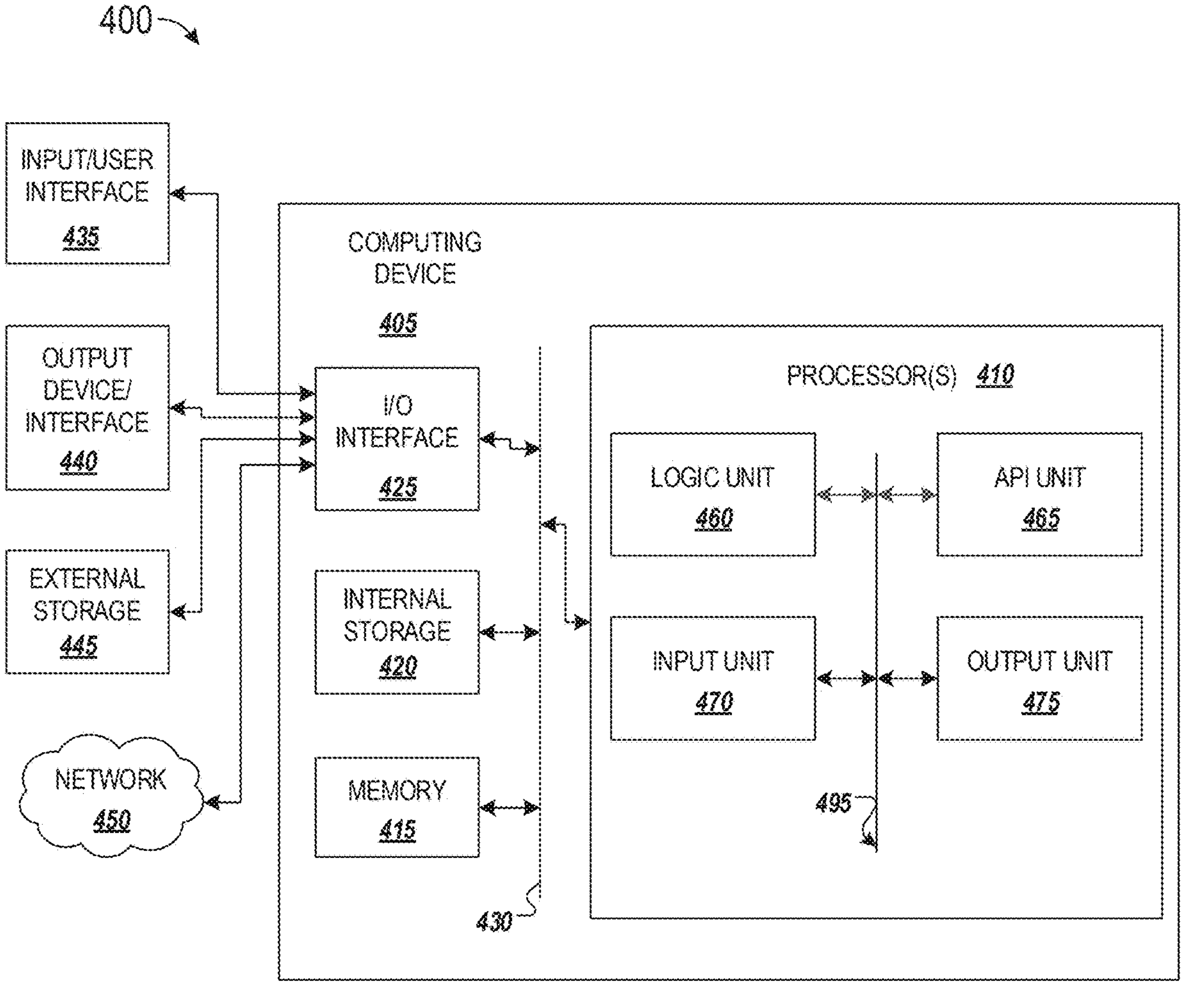
FIG. 4 illustrates an example computing environment with an example computer device suitable for use in some example implementations.

FIG. 4 illustrates an example computing environment with an example computer device suitable for use in some example implementations. Computing device 405 in computing environment 400 can include one or more processing units, cores, or processors 410, memory 415 (e.g., RAM, ROM, and/or the like), internal storage 420 (e.g., magnetic, optical, solid-state storage, and/or organic), and/or I/O interface 425, any of which can be coupled on a communication mechanism or bus 430 for communicating information or embedded in the computing device 405. I/O interface 425 is also configured to receive images from cameras or provide images to projectors or displays, depending on the desired implementation.

Computing device 405 can be communicatively coupled to input/user interface 435 and output device/interface 440. Either one or both of input/user interface 435 and output device/interface 440 can be a wired or wireless interface and can be detachable. Input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 440 may include a display, television, monitor, printer, speaker, braille, or the like. In some example implementations, input/user interface 435 and output device/interface 440 can be embedded with or physically coupled to the computing device 405. In other example implementations, other computer devices may function as or provide the functions of input/user interface 435 and output device/interface 440 for a computing device 405.

Examples of computing device 405 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 405 can be communicatively coupled (e.g., via I/O interface 425) to external storage 445 and network 450 for communicating with any number of networked components, devices, and systems, including one or more computer devices of the same or different configurations. Computing device 405 or any connected computer device can be functioning as, providing services of, or referred to as a server, client, thin server, general machine, special-purpose machine, or another label.

I/O interface 425 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, a satellite network, and the like).

Computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. One or more applications can be deployed that include logic unit 460, application programming interface (API) unit 465, input unit 470, output unit 475, and inter-unit communication mechanism 495 for the different units to communicate with each other, with the OS, and with other applications (not shown). The described units and elements can be varied in design, function, configuration, or implementation and are not limited to the descriptions provided. Processor(s) 410 can be in the form of hardware processors such as central processing units (CPUs) or a combination of hardware and software units.

In some example implementations, when information or an execution instruction is received by API unit 465, it may be communicated to one or more other units (e.g., logic unit 460, input unit 470, output unit 475). In some instances, logic unit 460 may be configured to control the information flow among the units and direct the services provided by API unit 465, input unit 470, and output unit 475, in some example implementations described above. For example, the flow of one or more processes or implementations may be controlled by logic unit 460 alone or in conjunction with API unit 465. The input unit 470 may be configured to obtain input for the calculations described in the example implementations, and the output unit 475 may be configured to provide output based on the calculations described in example implementations.

Processor(s) 410 can be configured to execute a method or computer instructions which can involve, receiving from a user interface that comprises at least one of a touchscreen, a keyfob, or a push button a command; and in response to receiving the command, performing steps to control a position of a sunshade, wherein the steps comprise communicating a command to at least one of a first set of motors or a second set of motors to control a movement of a belt, as illustrated in FIG. 1.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method of operating a sunshade system for a windshield of a vehicle having opposite pillars with the windshield therebetween, the method comprising:

receiving a first command from a user interface; and in response to receiving the first command, performing steps to control a position of a sunshade within respective slits of the opposite pillars, wherein the steps comprise communicating a second command to a first set of motors near a bottom of the windshield and a second set of motors near a top of the windshield to control a movement of a belt engaged with a freely-rotating guide gear disposed in each of the pillars to move a sunshade at least partially across the windshield, the freely-rotating guide gear positioned between the first set of motors and the second set of motors, and preventing drooping of the belt during operation.

2. The method of claim 1, wherein the second command comprises an instruction to rotate at least one of the first or second set of motors by a predetermined angle.

3. The method of claim 1, wherein the steps further comprise, in response to a stop condition being satisfied, communicating an instruction to stop to the first and the second set of motors.

4. The method of claim 1, further comprising, in response to detecting at least one of a temperature or a UV radiation level, automatically controlling a sunshade system to move the sunshade to a predetermined position.

5. The method of claim 1, further comprising receiving RF signals from an RF receiver included in the user interface to control the position of the sunshade.

6. The method of claim 1, further comprising remotely operating the sunshade.

* * * * *